Dec. 27, 1932.  H. S. MESSING  1,892,404
HYDRAULIC TURBINE
Filed Aug. 13, 1931   3 Sheets-Sheet 2

Inventor
HJALMAR S. MESSING
By Malcolm N. Gannett
Attorney

Dec. 27, 1932.  H. S. MESSING  1,892,404
HYDRAULIC TURBINE
Filed Aug. 13, 1931   3 Sheets-Sheet 3

INVENTOR
HJALMAR S. MESSING
BY
ATTORNEY

Patented Dec. 27, 1932

1,892,404

UNITED STATES PATENT OFFICE

HJALMAR S. MESSING, OF MILWAUKEE, WISCONSIN, ASSIGNOR TO S. MORGAN SMITH COMPANY, OF YORK, PENNSYLVANIA, A CORPORATION OF PENNSYLVANIA

HYDRAULIC TURBINE

Application filed August 13, 1931. Serial No. 556,798.

This invention relates to improvements in hydraulic turbines of the type wherein the blades of the runner are adjustable to vary their angle and the area of the water opening through the runner to correspond with the angle and opening of the wicket gates or guide vanes which control the admission of water to the runner.

An object of the invention is to provide an improved turbine in which means are provided by which the operating mechanism for the runner blades is actuated by the wicket gates or guide vanes controlling means, so that when the gates are adjusted, the relative positions of the blades will also be correspondingly adjusted and thereby maintain a definite relationship between the angle or position of the gates and the angle or position of the runner blades at all times.

Another object of the invention is to provide an improved turbine of the above type in which novel and effective means are provided for actuating the runner blades to adjust the angle thereof while the turbine is in operation.

Another object of the invention is to provide an improved turbine of the above type in which means are provided for utilizing power from the revolving runner shaft for operating the adjusting mechanism of the runner blades.

Another object of the invention is to provide an improved turbine of the character mentioned, which is simple in construction and reliable and exact in function under all conditions of service.

The invention also comprises certain new and useful improvements in the construction, arrangement and combination of the several parts of which it is composed, as will be hereinafter more fully described and claimed.

The present invention is applicable to turbine installations of the general class employing a runner having blades or buckets which are rotatable or adjustable so that their angle is variable with respect to the runner axis. A turbine of this type is shown and described in United States Letters Patent No. 1,467,672 granted September 11, 1923, to Victor Kaplan. While in the instant case the invention is shown applied to a turbine installation of one particular type, it will be understood that the invention is not restricted thereto, since the invention is applicable to turbine installations of other types.

Figure 1:
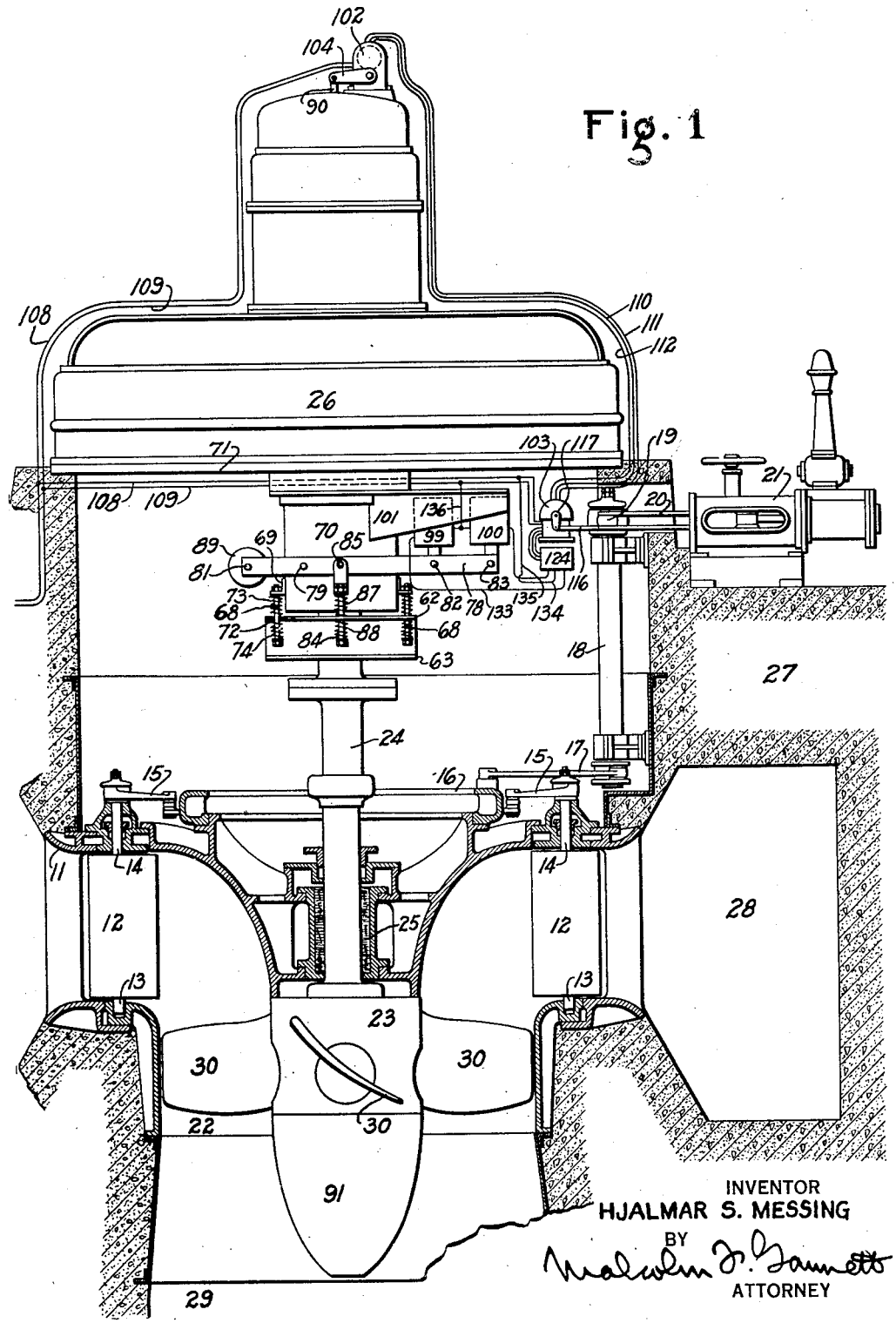
Figure 1 is a side elevation, partly in section, of a turbine employing a runner of the adjustable blade type and embodying blade adjusting and controlling means according to the present invention.

Referring to the drawings, and especially to Fig. 1, the turbine comprises a casing 11 which forms a peripheral water inlet in which are mounted an annular series of wicket gates or guide vanes 12. Projecting from the lower ends of the wicket gates 12, are trunnions 13 which are journalled in the adjacent portion of the casing 11. Likewise, stems 14 project upwardly from the wicket gates 12. The stems 14 are journalled in suitable bearings carried by the casing 11 and terminate a suitable distance thereabove.

The wicket gates 12 are adapted to be rotated simultaneously into different angular positions to control the flow of water into the turbine in the usual manner, and for this purpose the upper ends of the stems 14 are usually provided with gate operating arms 15 which are fixed to said stems and connected by links to a gate adjusting ring 16.

The gate adjusting ring 16 is connected by link means 17 to a shaft 18. Fixed to the upper end of the shaft 18, is an arm 19 which is connected by links 20 to the controlling member of a governor 21. If so desired, the governor may be of the usual type employed with turbines to adjust the gates thereof during the running of the turbine and thereby maintain the turbine at its rated speed notwithstanding variations in the load thereon.

The lower portion of the turbine casing forms an axially directed chamber 22 in which the runner 23 operates. The hub of the runner 23 is fixed to the lower end of a hollow or tubular shaft 24 which is journalled in a suitable bearing 25 in the upper portion of the turbine casing. The upper end of the runner shaft 24 is connected to the part to be driven. In the present instance, the shaft 24 is shown directly connected to an electrical generator 26 which is mounted in superposed position above the turbine.

Any suitable type of setting may be used for the turbine installation, a concrete setting 27 being shown in the present instance. This setting forms a scroll case 28 which surrounds the turbine inlet and is connected to receive water from a flume or other source of supply. The portion of the setting below the turbine forms a draft tube 29 into which the water is discharged from the runner. The electrical generator 26 may rest on the top of the setting as shown.

Figure 2:
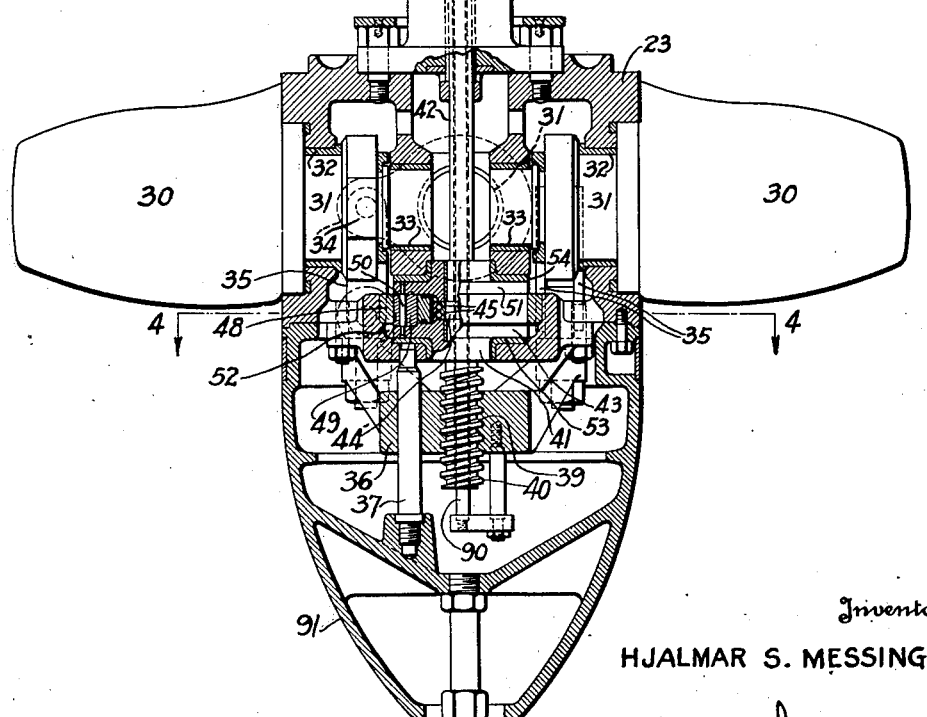
Fig. 2 is a view, mostly in vertical section, of the runner and its shaft.

As shown in Fig. 2, the hub of the runner 23 is bolted or otherwise fixed to the lower end of the runner shaft 24.

A suitable number of blades 30 are rotatably supported in the hub of the runner 23 and project radially therefrom. In the present instance four blades are shown (see also Fig. 1).

The inner end of each blade 30 is formed with a trunnion 31 which is journalled in bearings 32 and 33 supported in the hub. The construction is such that the blades are rotatable into different angular relationships with the axis of the runner.

Means are provided for simultaneously rotating all of the blades 30 and for maintaining them in equal angular relationship, such means comprising preferably an arm 34 rigidly fixed on the trunnion 31 of each blade and links 35 which pivotally connect the arms on the different blades to a cross head 36. The cross head 36 is guided to reciprocate in a direction axially of the runner by one or more guide pins 37 which are mounted in the hub of the runner in the manner shown in Fig. 2.

It will be understood that the relative positions of the blades 30 govern the area of the water passages or openings between the blades, and that when the blades are rotated, the area of the water passages is increased or diminished depending upon the direction in which the blades are moved.

As shown in Figs. 1 and 2, a cap 91 is bolted or otherwise removably secured to the lower end of the hub of the runner 23. Since the hub of runner is otherwise enclosed and the hub is hollow, the cap 91 provides a closed chamber or reservoir for containing a supply of grease for the lubrication of the various working parts of the mechanism contained within the hub of the runner.

The cross head 36 is formed with a threaded opening 39 which is located on the longitudinal center line of the runner 23. Mounted within the openings 39 is a screw 40. The screw 40, which is formed with a bore axially thereof, is connected to the driven member 43 of a speed reducer 41 contained within the hub of the runner.

Speed reducers of different kinds may be used, that shown being of the type shown and described in United States Letters Patent No. 1,543,791 granted June 30, 1925 to W. C. Pitter.

Figure 4:
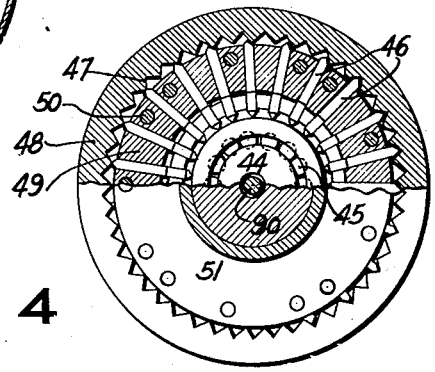
Fig. 4 is a transverse section taken on the line 4—4 of Fig. 2.

As shown in Figs. 2 and 4 the speed reducer comprises a driving member in the form of a hollow or tubular shaft 42, and a driven member 43 having a hub to which the screw 40 is fixed. The driving member or shaft 42 has an eccentric 44 thereon which supports a ball bearing or other anti-friction bearing 45.

As shown in Fig. 4, the outer member or race of the ball bearing 45 is surrounded by a series of radially disposed plungers 46. The inner ends of the plungers 46 bear on the outer race of the bearing 45 and the outer ends of said plungers are arranged to cooperate with teeth 47 formed concentrically within the outer or stationary casing member 48 which is keyed or otherwise fixed within the hub of the runner. Both ends of the plungers 45 are beveled and the teeth 47 are beveled.

The number of teeth 47 differs from the number of plungers 46 so that rotation of the eccentric 44 will cause the plungers 46 to be forced outwardly in succession around the circular series of teeth 47 and in consequence will cause the plungers to creep around within the stationary casing member 48.

The plungers 46 are guided to reciprocate in a member 49 which is fixed to the driven member 43 by pins 50 so that the creeping motion of said plungers around the toothed interior of the stationary member 48 will be transmitted to the driven member 43. The motion of the driving member 42 is thus transmitted to the driven member 43, but at a great reduction in speed ratio.

The pins 50 may also secure the head 51 of the speed reducer to the driven member 43 thereof, as shown in Fig. 2. The driven member 43 and the head 51 provide bearings in which the driving member or shaft 42 revolves.

The speed reducer may be rotatably mounted within a hollow portion or chamber 52 formed within the hub of the runner, by thrust bearings 53 and 54 of any suitable kind.

The speed reducer 41 is actuated to effect changes in the angular positions of the runner blades by means which, according to the present invention, receives its motion and power from the revolving runner shaft 24, such means being preferably in the form of a reversible roller friction drive.

Figure 3:
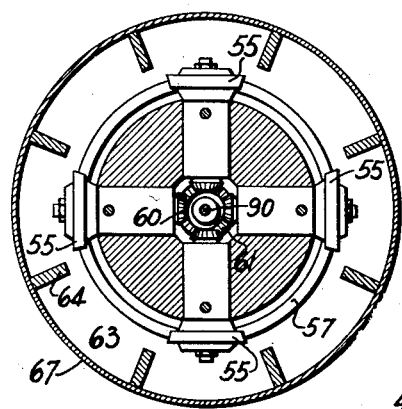
Fig. 3 is a horizontal section taken on the line 3—3 of Fig. 2.

As shown in Figs. 2 and 3, the friction drive comprises a series of friction rollers 55 which project radially from and are carried in a circular path by the rotation of the runner shaft 24.

The friction rollers 55 are associated with a pair of tracks 56 and 57, one or the other of which is adapted to cooperate with said rollers and to thereby revolve them in one or the other direction.

For the purpose of operatively connecting the friction rollers 55 to the shaft 42, bevel gears 60 are provided. The gears 60 are in meshing relationship with a bevel gear 61 which is mounted on the upper end of the shaft 42 of the speed reducer.

The tracks 56 and 57 are beveled to conform with the beveled faces or circumferences of the friction rollers 55. These tracks are carried on or formed as a part of a frame which, as shown in Fig. 2, comprises a pair of spaced annular plates 62 and 63, which are rigidly connected by intervening webs 64. If so desired the webs 64 may be made integral with the plates.

The plates 62 and 63 are spaced apart sufficiently so that the distance between the tracks 56 and 57 is greater than the diameter of the rollers 55. With such construction, when the frame is located centrally of the height of the rollers as shown in Fig. 2, both tracks will be out of contact with the rollers. The tracks 56 and 57 have preferably smooth friction faces to frictionally engage the peripheries of the rollers 55. Preferably the frame is enclosed by a sheet metal side wall 67 which may be secured to the top and bottom plates 62 and 63 in any suitable manner.

The frame carrying the tracks 56 and 57 is supported by a plurality of rods or bolts 68 which are suspended from brackets 69 fixed on the outer side of a tubular housing 70. The housing 70 encloses the upper portion of the runner shaft 24, as shown in Fig. 1, and in turn is suspended from a support 71 mounted in the setting. The lower portions of the rods or bolts 68 extend through openings 72 in the top plate 62.

Coiled springs 73 and 74 encircle the rods 68 above and below the top plate 62 and bear against the upper and lower sides thereof. The opposing actions of the upper and lower springs are so adjusted that normally the springs will support the frame in a positoin where the tracks 56 and 57 are out of contact with and are spaced equidistantly above and below the friction rollers 55, as shown in Fig. 2. When the parts are so disposed, the friction drive is in a neutral or non-operative position. The yield of the springs 73 and 74, however, will permit the frame to be lowered or raised and thus bring the track 56 or the track 57 into engagement with the friction rollers 55 while the frame is held against rotation, so that the rollers 55, as they are carried around with the runner shaft 24, will be caused to revolve, in one direction or the other on their own axis. Rotation of the frame carrying the friction tracks 56 and 57 is prevented by the rods or bolts 68.

The track frame is raised or lowered by means of a rocker frame to bring one or the other of the tracks 56 and 57 thereon into engagement with the friction rollers 55.

As shown in Figs. 1 and 2, the rocker frame comprises a pair of side members or arms 78 which are arranged at opposite sides of the stationary supporting housing 70.

The side members or arms 78 are pivotally supported on the housing 70 by pivot pins 79.

The side members or arms 78 are rigidly connected by cross members 81, 82 and 83, so that said members can swing in unison about the pivots provided by the pins 79.

As shown in Figs. 1 to 2, the side members or arms 78 are operatively connected to the top plate 62 of the track frame by rods 84. The upper ends of the rods 84 are pivotally connected to the arms 78 by pivot pins 85. The lower portions of the rods 84 extend loosely through guide holes 86 in the plate 62.

Coiled springs 87 and 88 encircle each of the rods 84 above and below the plate 62 and bear respectively on the upper and lower sides thereof.

Rocking of the arms 78 vertically about the pivots 79 will reciprocate the rods 84 vertically and said rods will, through the action of the springs 87 and 88, transmit vertical movements to the track frame, the frame being raised or lowered to bring one or the other of the friction tracks 56 and 57 thereon into engagement with the friction rollers 55, according to the direction in which the arms 78 are rocked.

The rods 84 are preferably arranged to engage the top plate 62 at diametrically opposite sides thereof so that the weight of the track frame will be balanced. In this way the track frame will tend to hang in a level position with the tracks 56 and 57 spaced equidistantly around their circumferences from the friction rollers 55, when the frame is in its neutral position. Furthermore, the diametrical location of the rods 84 with respect to the track frame will cause the downward or upward pressure applied to the frame to bring the track 56 or 57 into engagement with the friction rollers 55, when the arms 78 are rocked in one direction or the other, to be applied uniformly around the circumference of the track.

The rocker frame and the parts connected thereto are preferably counterbalanced by a counterweight 89, which is mounted between the arms 78 and supported by the cross bar 81.

As shown in Figs. 1 and 2, a restoring rod 90 is fixed at its lower end to the cross head 36 and extends upwardly through the hollow screw 40, speed reducer 41, the runner shaft 24, and the generator shaft, to the top of the generator 26, for a purpose to be hereinafter more fully described.

The rocker arms 78 may be operated in different ways in order to adjust the angle or degree of opening of the runner blades to conform with the angle or opening of the gates which control the admission of water to the turbine. Obviously, the rocker arms may be operated for this purpose by hand or other power applied to the free ends thereof.

In the present embodiment of the invention, electrically operated means are employed for controlling the friction drive mechanism, thus enabling the runner blades to be adjusted automatically when the wicket gates are adjusted.

Figure 5:
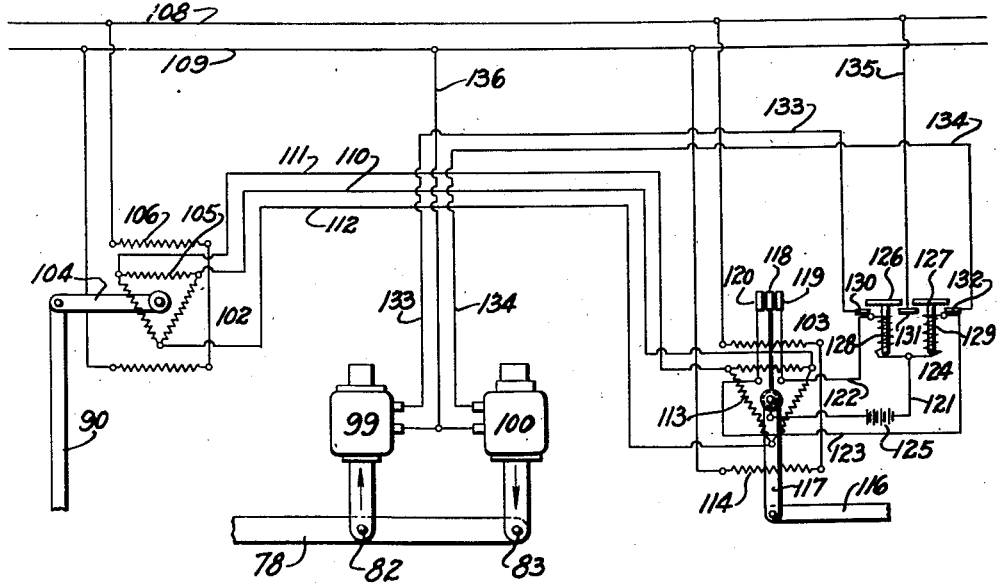
Fig. 5 is a diagrammatic view of the electrical controlling system shown in Fig. 1.

As shown in Figs. 1 and 5, a pair of solenoids 99 and 100 are provided. These solenoids are mouned on a stationary support 101 which may be an extension of the stationary support 71. The armatures or cores of the solenoids 99 and 100 are operatively connected to the cross members 82 and 83 respectively, which connect the rocker arms 78.

The solenoid 99 is of a construction which will cause it to pull its armature or core upwardly when the solenoid is energized, and thereby swing the rocker arms 78 upwardly about their center of fulcrum as provided by the pivots 79. This action will bring the track 57 into operative engagement with the friction rollers 55.

The solenoid 100 is of a construction which will cause it to push its armature or core downwardly when the solenoid is energized, and thereby swing the rocker arms 78 downwardly about their pivotal center or fulcrum. This action will bring the track 56 into operative engagement with the friction rollers 55.

In this way, when the solenoid 99 is energized, the parts will be operated so as to cause the runner blades to be turned in one direction, and when the solenoid 100 is energized, the runner blades will be turned in the opposite direction.

Means are provided which cooperate with the solenoids 99 and 100 so as to effect the adjustment of the runner blades to conform with different angles or positions of the wicket gates during the running of the turbine.

As shown in Fig. 5, I prefer to utilize a pair of self-synchronous electric motors which may be of the type used in so-called "Selsyn" systems similar to those disclosed in United States Letters Patents No. 1,576,189 granted March 9, 1925, to E. M. Hewlett, et al., and No. 1,612,120 granted December 28, 1925, to L. E. Hilderbrand, to which reference may be had for a detailed description of the construction and mode of operation of such systems.

It is deemed sufficient to set forth that such systems comprise a transmitting device 102 and a receiving device 103. The devices 102 and 103 are similar in construction, each having a single phase field winding and a polycircuit armature winding, one of these windings being on the stator and the other winding on the rotor of the respective devices. The field windings are excited from a suitable source of single phase alternating current and thereby set up fields which interlink with their respective armature windings. The like points of the polycircuit armature windings are electrically connected so that a change in the angular position of the rotor of one device will set up unbalanced voltages in the armature windings, in consequence of which a torque is developed which acts to bring the rotors of the different devices into the same or corresponding angular positions.

As shown in Fig. 5, the restoring rod 90, which is connected to the runner blade adjusting mechanism, is operatively connected by an arm 104 to the rotor of the transmitter 102.

The transmitter 102 has a three phase delta connected armature winding 105 and a field winding 106. One terminal of the field winding 106 is connected to a conductor 108 and the other terminal of the field winding 106 is connected to a conductor 109. The conductors 108 and 109 constitute a main power line for supplying single phase alternating current to the apparatus from a suitable source of supply, so that the field winding 106 is excited.

The different phase points of the armature winding 105 of the transmitter 102 are interconnected by conductors 110, 111 and 112 to the like phase points of the three phase armature windings 113 of the receiver 103.

The receiver 103 has a field winding 114; one terminal of which is connected to the conductor 108, and the other terminal of which is connected to the conductor 109, so that the field winding of the receiver is excited.

The link 20 of the governor 21 is connected by a link 116 to the operating lever 117 of a switch member 118 mounted rotatably on the shaft of the rotor of the receiver 103.

The switch member 118 has a contact which is disposed in spaced relation between the contacts of a pair of switch members 119 and 120 carried by the rotor of the receiver, so that the switch member 118 may swing into engagement with one or the other of the switch members 119 and 120 to make electrical contact therewith.

A pilot device 124 is provided for controlling the circuits through which current is supplied to the solenoids 99 and 100, said device comprising two switch members 126 and 127, which are operated respectively by relay coils 128 and 129.

The switch member 119 is connected by a conductor 122 to one terminal of the relay coil 128, and the switch member 120 is connected by a conductor 123 to one terminal of the relay coil 129, the switch member 118 being connected to the other terminals of said relay coils by a conductor 121.

The relay coils 128 and 129 are adapted to be energized by low voltage electric current as supplied from a storage battery 125 connected to the conductor 121. This constitutes what will hereinafter be referred to as the low voltage circuit.

The switch member 126 is adapted to engage contacts 130 and 131, and the switch member 127 is adapted to engage the contact 131 and a contact 132.

The contact 130 is connected to one terminal of the solenoid 99 by a conductor 133, and the contact 132 is connected to one terminal of the solenoid 100 by a conductor 134. The contact 131 is connected to the main line high voltage conductor 108 by a conductor 135, and the other main line high voltage conductor 109 is connected to the other terminals of the solenoids 99 and 100 by a conductor 136.

In operation, the bevel gear 61 will be driven in one direction or the other, depending upon whether the track 56 or the track 57 is brought into engagement with the friction rollers 55. The motion of the gear 61 will be transmitted through the speed reducer to the screw 40 and the latter rotating at greatly reduced speed within the cross head 36, will raise or lower said cross head. The cross head 36 acting through the links and arms hereinbefore described will simultaneously rotate the runner blades 30 about their trunnions as axes toward closed or open position or into any desired intermediate position. For example, the runner blades are moved toward closed position when the friction rollers 55 are engaged by the track 57. The runner blades maintain a set position or angle or opening while both of the tracks are out of engagement with the friction rollers.

When the governor 21 operates to swing the wicket gates toward open or closed position to vary the gate opening to conform with the variations in the load on the turbine, the link 20 will operate through the link 116 and the lever 117, to swing the movable switch member 118 against either of the switch members 119 or 120, according to the direction in which the governor operates, thereby making an electrical contact between the switch members 118 and 119, or between the switch members 118 and 120, as the case may be.

The electrical contact of the switch members 118 and 119 or 120 closes the low voltage circuit of the pilot device 124, through the conductors 121, 122 or 123 respectively, so that either the relay coil 128 or the relay coil 120 is energized. When the relay coil 128 is energized, the switch member 126 is engaged with the contacts 130 and 131, and when the relay coil 129 is energized, the switch member 127 is engaged with the contacts 131 and 132.

When switch member 126 engages contacts 130 and 131, the circuit is closed through which high voltage single phase electrical current is supplied for energizing the solenoid 99 from conductor 108, through conductor 135, contacts 131, 125, and 130, conductor 133 to one terminal of the solenoid 99, thence through the coil of the solenoid, and from the other terminal of said solenoid through the conductor 125 to the conductor 109.

When switch member 127 engages contacts 131 and 132, the circuit is closed from the main line conductor 108, through conductor 135, contacts 131, 127 and 132, conductor 134 to one terminal of the solenoid 99, thence through the coil of the solenoid, and from the other terminal of said solenoid through the conductor 136 to the conductor 109, so that the solenoid 100 is energized.

When the solenoid 99 or 100 is energized, the rocker arms 78 will be swung upwardly or downwardly respectively and set the friction roller mechanism into operation to rotate the screw 40 and thereby rotate the runner blades toward open or closed position to conform with the position into which the gates have been shifted.

Since the restoring rod 90 is connected to the runner blade adjusting means and moves downwardly or upwardly while the runner blades are moving toward open or closed position respectively, and the restoring rod is connected by the arm 104 to the rotor of the transmitting device 102, the rotor of said transmitting device will begin to rotate as soon as the change in angle or position of the runner blades commences. The rotation of the rotor of the transmitting device 102 is transmitted to the rotor of the receiving device 103, under the influence of the voltages in the interlinked rotor windings tending to bring the rotors into angular agreement, so that the rotor of the receiving device 103 is rotated to a position corresponding to that into which the rotor of the transmitting device 102 has been rotated. This action of the rotor of the receiving device 103 causes the switch member 118 to be moved away from the switch member 119 or 120 with which it is in contact, so that the circuit through which the solenoid 99 or 100 is energized, is opened and such solenoid is de-energized.

When either solenoid is de-energized, the arms 78 will be moved to a position in which the operation of the roller friction mechanism is interrupted. The runner blades will then have been brought into a position corresponding to the position of the gates. The parts will then remain so positioned relative to each other until the gates are again operated, whereupon a runner blade adjusting operation similar to that just described will again take place to automatically move the runner blades into proper position with respect to the position assumed by the gates.

The springs 87 and 88 which lower and raise the friction tracks 56 and 57 are of such strength as to allow the solenoids 99 and 100 to complete their full strokes and to press the tracks against the friction rollers 55 with the necessary force to effect rotation of the rollers, without requiring an absolutely exact relationship between the extreme positions of the solenoids and the operative positions of the tracks. The springs 87 and 88 are preferably larger or of greater strength than the springs 73 and 74 which normally hold the friction tracks 56 and 57 in neutral position, so that they may easily overcome the power of the springs 73 and 74 and bring one or the other of the tracks into agreement with the rollers 55 when one or the other of the solenoids is energized. However, the springs 73 and 74 have sufficient strength to promptly restore the tracks 56 and 57 and the arms 78 to neutral position when the respective solenoid is de-energized. The symmetrical arrangement of the friction rollers about the axis of the runner shaft 24 balances them and thereby avoids objectionable vibration, this being especially desirable in installations where the runner revolves at high speed.

The mechanism for operating the cross head 36 to effect angular adjustments of the runner blades 30 is more fully shown and described in my copending application filed even date herewith, Serial No. 556,797.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

Having thus described the invention, what I claim and desire to secure by Letters Patent is:

1. The combination with a runner having a hollow hub and a plurality of blades carried by the hub and movable into different angular positions, and a cross head mounted in the hub of the runner and movable axially thereof and connected to the blades for adjusting the positions thereof, of actuating means for the cross head comprising a rectilinearly movable member, means coacting with said member when said member is moved rectilinearly in either direction and operative by the rotating movement of the runner, a shaft operatively connected with said means, a speed reducer mounted in the hub of the runner and operatively connected with said shaft, and a screw driven by said speed reducer and operatively connected with said cross head.

2. The combination with a runner having a hollow hub and movable blades carried by said hub, of a cross head mounted within the hub and operatively connected to the blades, a threaded opening formed axially through said cross head, a rotatable rod mounted within said hub and having an externally threaded portion coacting with the threaded opening in said cross head, a hollow runner shaft projecting axially from said hub, a plurality of rollers rotatable with the runner shaft and also rotatable on their own axes, a pair of opposed tracks between which the rollers travel, said tracks being movable into engagement with the rollers to cause rotation thereof in either direction about their axes, means for normally holding the tracks out of engagement with the rollers, means for moving the tracks into operative engagement with said rollers, a shaft mounted in said runner shaft and operatively connected with said rollers, and means mounted in the hub of said runner and operatively connected with said last-named shaft and also with said threaded rod for transmitting the motion of said last named shaft to said threaded rod at a reduced speed.

In testimony whereof, I hereunto sign my name.

HJALMAR S. MESSING.